(12) United States Patent
Ragan et al.

(10) Patent No.: US 8,408,150 B1
(45) Date of Patent: Apr. 2, 2013

(54) SEWING AID

(76) Inventors: Tenna M. Ragan, Paw Paw, MI (US);
Sherry L. Sandlin, Paw Paw, MI (US)

( * ) Notice: Subject to any disclaimer, the term of this patent is extended or adjusted under 35 U.S.C. 154(b) by 0 days.

(21) Appl. No.: 13/200,187

(22) Filed: Sep. 20, 2011

(51) Int. Cl.
*D05B 35/00* (2006.01)

(52) U.S. Cl. ........................................ 112/136

(58) Field of Classification Search ............. 112/475.08, 112/475.18, 475.09, 117, 118, 119, 136; 33/484, 562, 563, 564, 565, 566
See application file for complete search history.

(56) References Cited

U.S. PATENT DOCUMENTS

| | | |
|---|---|---|
| 2,805,007 A | 9/1957 | Aschbacher |
| 3,154,861 A | 11/1964 | Rubenstein |
| 3,527,181 A | 9/1970 | Beamon |
| 4,266,699 A * | 5/1981 | Ladd ................ 223/34 |
| 4,520,533 A * | 6/1985 | Kasai ............... 24/198 |
| 4,825,788 A | 5/1989 | Julien |
| 7,543,388 B2 * | 6/2009 | Christensen et al. ....... 33/194 |
| 7,770,308 B2 * | 8/2010 | Leoncini ............ 36/54 |
| 7,854,073 B1 * | 12/2010 | Webb ............... 33/566 |
| 2007/0261260 A1 | 11/2007 | Loza |

FOREIGN PATENT DOCUMENTS

GB 2 292 568 A 2/1996

* cited by examiner

*Primary Examiner* — Tejash Patel
(74) *Attorney, Agent, or Firm* — Flynn, Thiel, Boutell & Tanis, P.C.

(57) ABSTRACT

A sewing tool is provided which has a plurality of apertures therein, each of which is trapezoidal in shape. The apertures are different sizes with respect to one another, each to be used for a different size box-bottom sewn item, such as a tote bag. A method of using such a sewing tool to create an item such as a box-bottom tote bag is also provided.

13 Claims, 5 Drawing Sheets

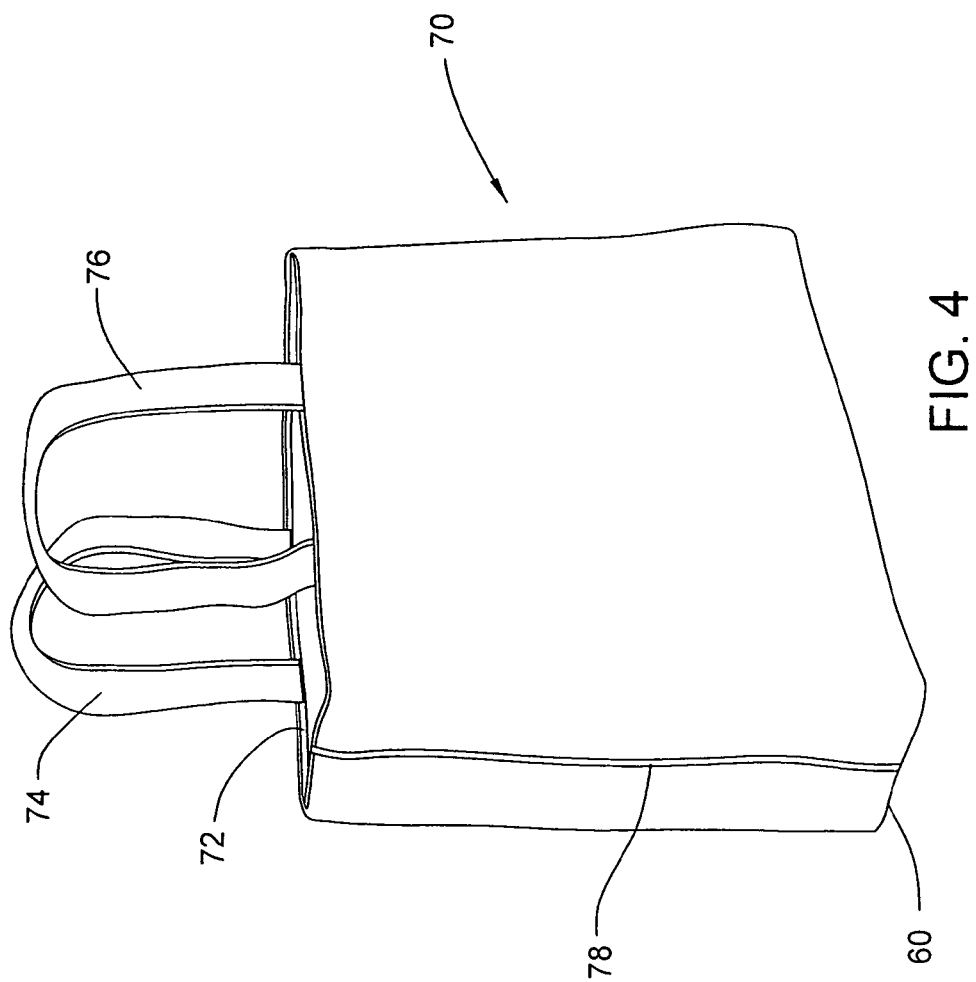

SEWING AID

BACKGROUND OF THE INVENTION

This invention relates generally to tools used for sewing, and more specifically to tools used in the sewing of tote bags and the like.

There is often a desire to include a square-bottom, also known as a box-bottom, in sewn items such as tote bags. Most commonly, to create such a box-bottom, two pieces of fabric have been sewn together, one on top of the other, and the backside of a corner marked using a ruler, and/or straight edge to draw or score lines to create a square-shaped area in the corners of the fabric. The two pieces of sewn fabric are pulled apart from one another to align the seams and the marks, on opposite sides of the seams, with the seam centrally located. One then sews along the line. The opposite corner is also created in this fashion and the sewn fabric is turned right-side out to create the box-bottom. Thus, each corner of the box-bottom takes significant time and work to accomplish.

To quicken the procedure and make it easier, one aspect of the present invention relates to a sewing aid or tool made of a semi-rigid material that can be used to easily mark fabric to create a box-bottom. This tool is preferably triangular in shape and includes multiple trapezoidal-shaped bores therein, which are each a different size. The tool also preferably includes a vertical line that is disposed in the center of the tool and is central to the multiple bores therein.

In use, two rectangular or square pieces of fabric are sewn together, one on top of the other on three sides, leaving one side open. The sewn piece is folded to generally create a triangle, aligning the seam of one side with another adjoining seam. A point of the fabric triangle is pulled through one of the bores in the sewing tool from the bottom until the edges of the fabric abut the lower corners of the trapezoidal bore through which the fabric is pulled. Using the bottom edge of the trapezoidal bore as a guide, a line is marked on the fabric, such as with a fabric pen, and the fabric is pulled away from the tool. A seam is then sewn on the line on the fabric. These steps are then repeated for the opposite corner of the fabric. The sewn fabric piece is then turned right side out and the bottom is complete.

Other advantages, objects and/or purposes of the invention will be apparent to persons familiar with constructions of this general type upon reading the following specification and inspecting the accompanying drawings.

BRIEF DESCRIPTION OF THE DRAWINGS

FIG. 4 is a perspective view of a box-bottom tote bag made in part using a sewing tool of the present invention;

DETAILED DESCRIPTION OF THE PREFERRED EMBODIMENTS

Figure 1:
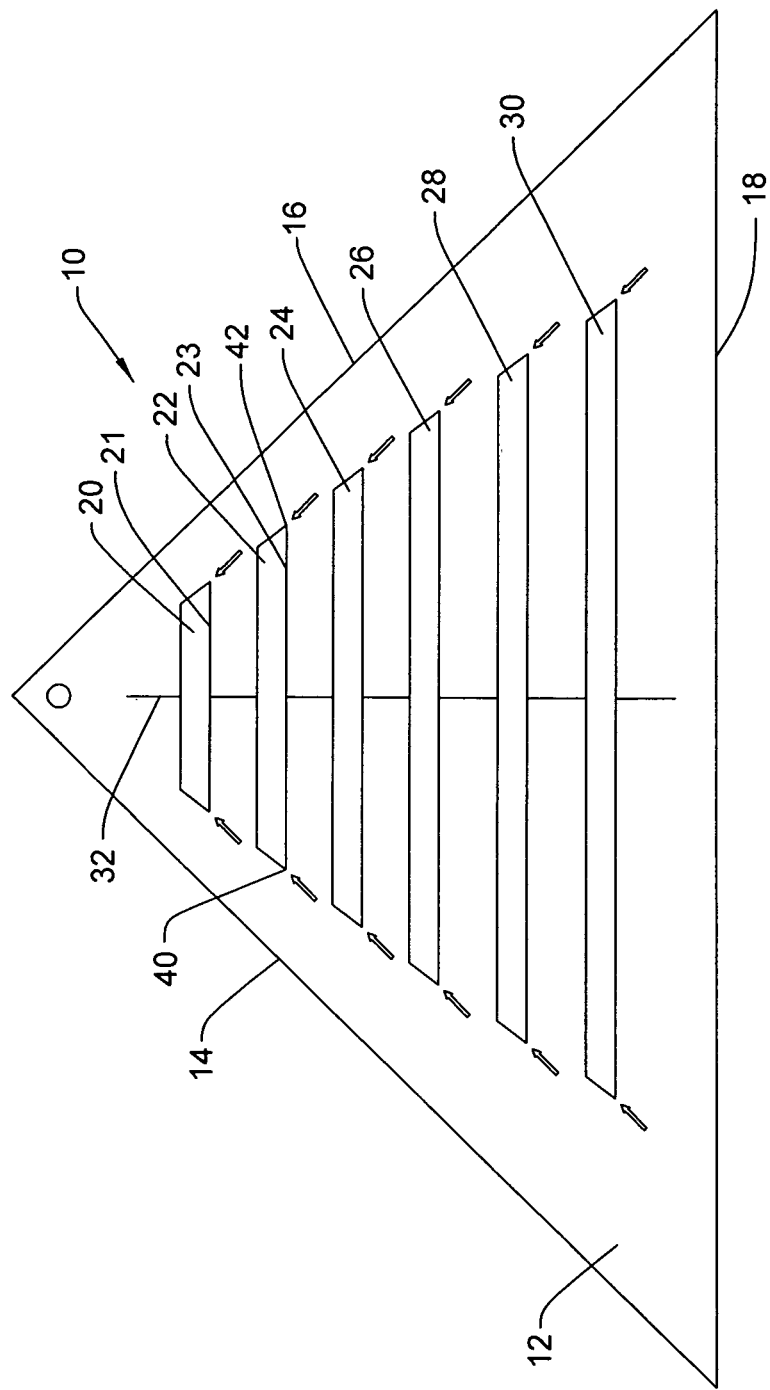
FIG. 1 is an elevational view of a triangular sewing tool, with six apertures, that is an embodiment of the present invention.

FIG. 1 shows a preferred embodiment of a sewing tool 10 of the present invention. Sewing tool 10 is preferably triangular and preferably made of a substantially rigid substance, more preferably of acrylic, and even more preferably of 0.060 inch thick substantially clear acrylic. Sewing tool 10 includes a substantially flat upper surface 12, two side edges 14, 16, and a bottom edge 18. Sewing tool 10 has six apertures or slots of varying sizes. The smallest aperture is designated as 20 and the largest aperture is designated as 30, with apertures 22, 24, 26, and 28 being intermediate sizes. Aperture 20 includes a bottom 21 and aperture 22 includes a bottom 23. Although the apertures can be any size desired, in a preferred embodiment, the smallest aperture 20 is 2 inches wide at its bottom, and the next smallest aperture 22 is 3 inches wide at its bottom, on up to the largest aperture 30 being 7 inches wide at its bottom. Sewing tool 10 also includes a line 32 extending down the center of sewing tool 10, which is also medial with respect to the apertures 20, 22, 24, 26, 28, 30. Line 32 may be drawn on the surface of sewing tool 10 or may be a groove. Moreover, line 32 may be on the top surface 12 of sewing tool 10 or may be on its bottom surface, as long as it is visible from the top during use.

Figure 2A:
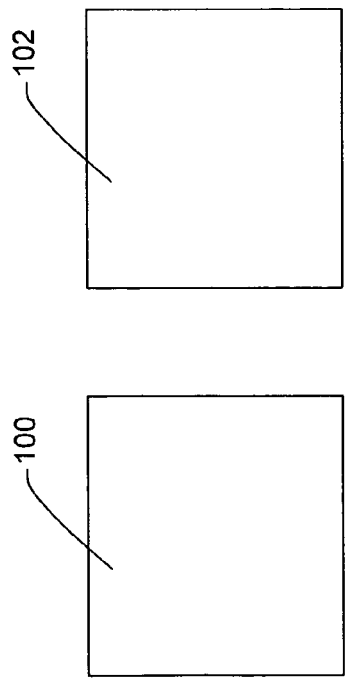
FIG. 2a is an elevational view of two pieces of fabric that together may be used with the present invention.

Sewing tool 10 is used with a sewn piece of fabric. Each sewn piece of fabric is made of two unsewn pieces of fabric such as those shown in FIG. 2a and depicted as 100 and 102, which are substantially the same size. The preferable sizes of starting fabric are shown below in the following table:

| Part No. | Slot Size | Fabric Size |
|---|---|---|
| 20 | 2" Slot | 2-8 ½" Squares |
| 22 | 3" Slot | 2-15" Squares |
| 24 | 4" Slot | 2-18" Squares |
| 26 | 5" Slot | 2-20" × 18" Rectangles |
| 28 | 6" Slot | 2-22" × 19" Rectangles |
| 30 | 7" Slot | 2-24" × 21" Rectangles |

Figure 2B:
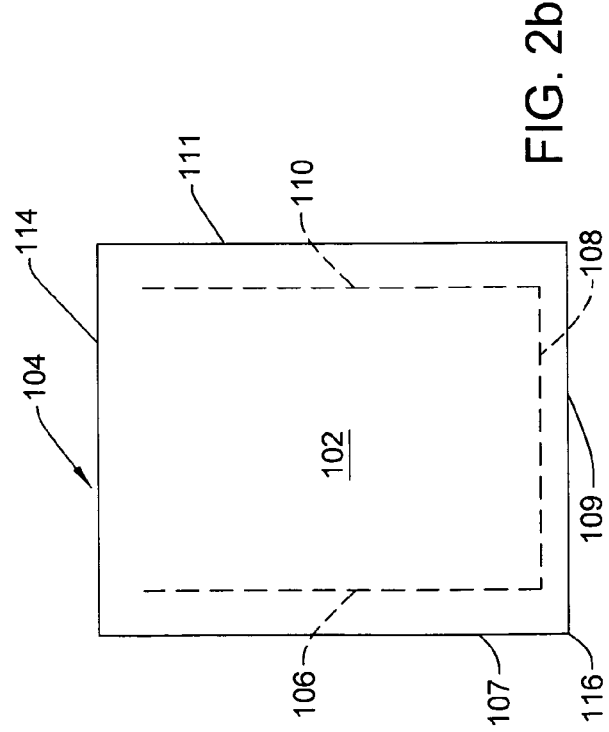
FIG. 2b is an elevational view of the two pieces of fabric of FIG. 2a, sewn together to create a sewn piece.

The two fabric pieces 100, 102 are placed one on top of the other with their respective right edges aligned. Three sides of fabric pieces 100, 102 are sewn together creating a sewn piece 104 as shown in FIG. 2b. Sewn piece 104 includes seams 106, 108, and 110, which result in a first sewn side edge 107, a sewn bottom edge 109, a second sewn side edge 111, and an open top 114. The junctions of the edges create corners; for example, the junction of edges 107 and 109 creates a corner 116.

Figure 2C:
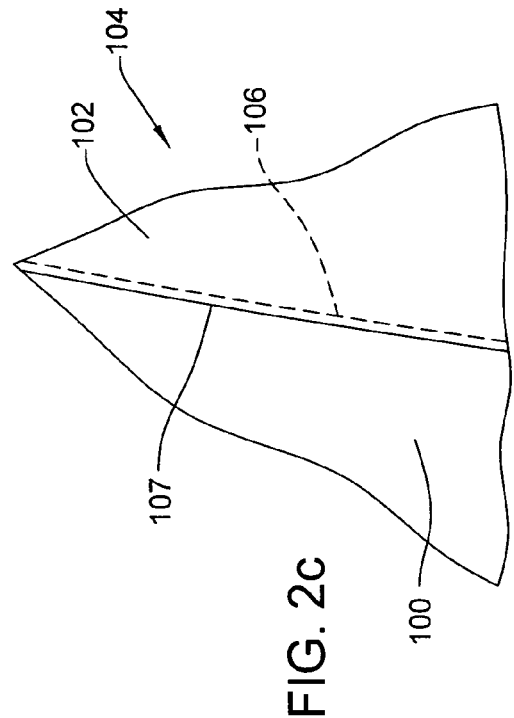
FIG. 2c is an elevational view of the sewn piece of FIG. 2b with seams aligned.

Prior to using sewing tool 10, fabric pieces 100 and 102 of sewn piece 104 are pulled apart from each other at adjacent edges, such as 107, 109. The respective seams, 106 and 108, are aligned, preferably in a vertical fashion, which will position corner 116 above the remainder of sewn piece 104. The seams 106, 108 are aligned front to back, and the sewn piece 104 may be ironed and/or pinned, to assist in maintaining the structure of the sewn piece 104, as shown in FIG. 2c.

Figure 3:
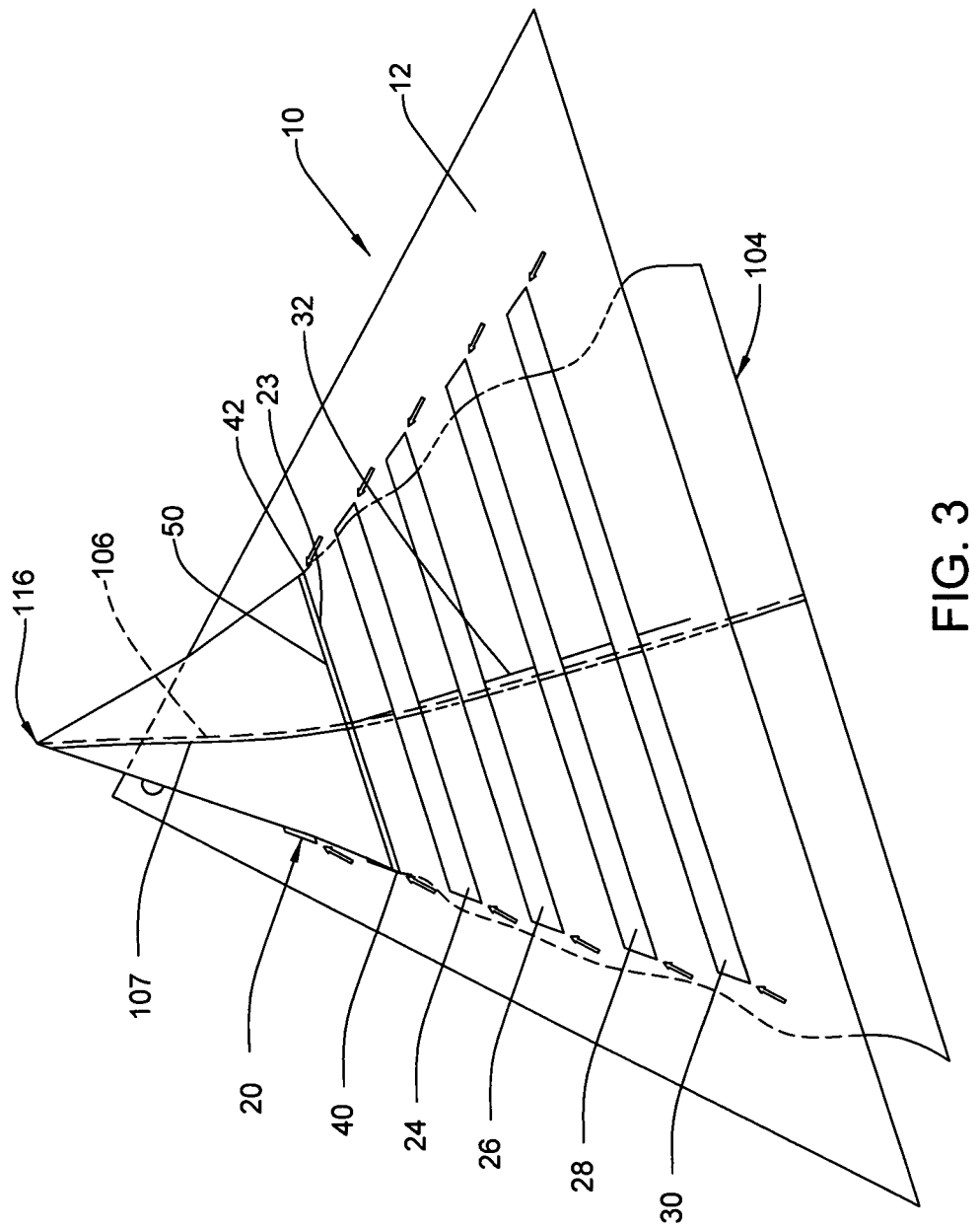
FIG. 3 is a perspective view of an embodiment of the sewing tool of the present invention in use with the sewn piece of FIG. 2c.

To use sewing tool 10, a portion of the folded sewn piece 104 is pulled through one of the apertures, such as aperture 22, corner 116 first, as shown in FIG. 3. Line 32 is used as a guide to position the sewn piece medially with respect to the aperture, with seam 106 centrally located. The sewn piece 104 is pulled through to a point where the fabric edges abut corners 40, 42 of aperture 22. A line 50 is then drawn on the fabric, using the bottom edge 23 as a guide. The sewn piece 104 is then removed from the sewing tool 10 and a seam is sewn along line 50. This process is repeated for the opposite side, using the opposite corners, and the sewn piece 104 is turned right side out, creating a box-bottom 60, as shown in FIG. 4. The remainder of the item, such as a tote bag 70, can then be finished. For a tote bag, the top raw edge should be folded inwardly, preferably between a ½ inch and 1½ inches depending on the size of the bag, creating a smooth rolled-over edge 72. If a lining is desired, the process can be repeated using the same size aperture of sewing tool 10 and the lining can be sewn into the interior of the tote bag 70 or other item.

To attach straps 74, 76 to a tote bag, an appropriate amount of strapping should be provided, and the straps sewn. Using the same size aperture of the sewing tool 10 as for the tote bag 70 itself, the tool 10 is placed flat on the inside of the bag, with the center line 32 aligned with a side seam 78 of the bag 70. A fabric pen is then used to make two marks on the inside of the bag 70 where each lower corner of the appropriate aperture in the sewing tool 10 is located on the inside of the bag 70. The strap is then positioned so that the strap ends line up with the raw edge of the rolled over edge 72. This process is repeated until all of the strap ends are positioned, and preferably pinned. The straps are then sewn to the lining and fabric, preferably with a ¼ inch seam allowance. For larger totes, a rectangle may be sewn on the strap and through the bag to hold the straps to the tote. An "X" may be sewn inside the rectangle for added strength.

Figure 6:
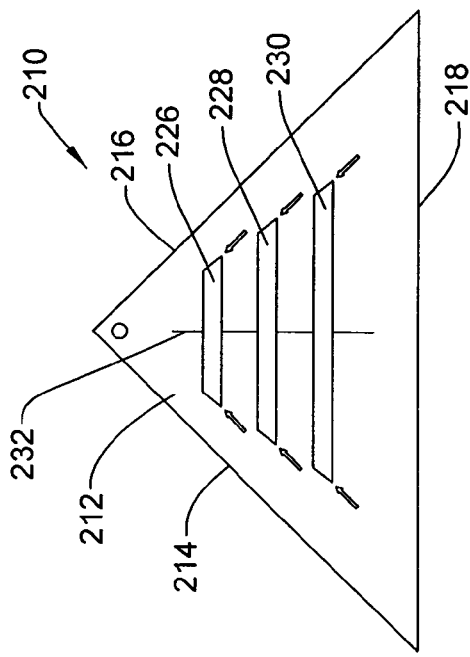
FIG. 6 is an elevational view of a third embodiment of a sewing tool of the present invention.
Figure 5:
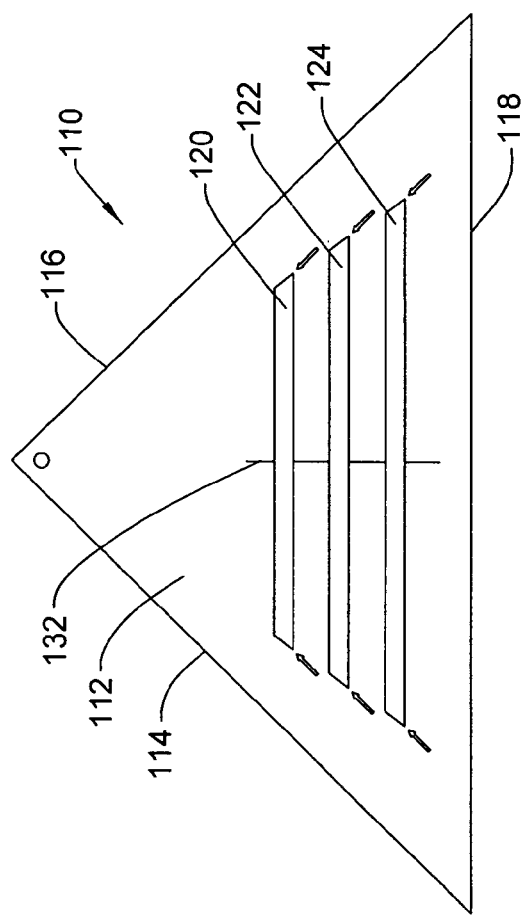
FIG. 5 is an elevational view of a second embodiment of a sewing tool of the present invention.

Two additional embodiments of the sewing tool are shown in FIGS. 5 and 6. A sewing tool 110 of FIG. 5 has three smaller apertures 120, 122, 124, which are preferably 2 inches, 3 inches, and 4 inches, respectively. However, other size apertures are contemplated. Sewing tool 110 includes a flat top surface 112 and three edges 114, 116, 118. Sewing tool 110 also preferably includes a central line 132, which is transverse to the longitudinal direction of the apertures 120, 122, 124. The line 132 may be grooved or printed on sewing tool 110.

Another embodiment of a sewing tool 210 is depicted in FIG. 6. Sewing tool 210 includes a top surface 212, and three edges 214, 216, 218. Sewing tool 210 preferably includes three larger apertures, 226, 228, 230, which are sized 5 inches, 6 inches, 7 inches in width, respectively. Apertures of other sizes and more or less apertures are also contemplated. Sewing tool 210 also preferably includes a grooved or printed central line 232, which is transverse in direction to the longitudinal direction of the apertures 226, 228, 230.

Sewing tools 110 and 210 are used in the same way as described above with respect to sewing tool 10. Other sizes and shapes of such a sewing tool may be employed.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A sewing aid for making a box-bottom item, comprising: a substantially rigid implement having at least three peripheral edges and a plurality of trapezoidal-shaped apertures therein, each one of the plurality of trapezoidal-shaped apertures sized to receive a corner of a fabric member comprised of two pieces of fabric sewn together, and each one of the plurality of trapezoidal-shaped apertures having a length dimension, the implement having a central visible line which is oriented substantially perpendicularly to the length dimensions of the plurality of trapezoidal-shaped apertures and adjacent the plurality of trapezoidal-shaped apertures for aligning the fabric member received in one of the plurality of trapezoidal-shaped apertures.

2. The sewing aid of claim 1, wherein the implement having the plurality of trapezoidal-shaped apertures comprises at least three trapezoidal-shaped apertures.

3. The sewing aid of claim 2, wherein the implement having the plurality of trapezoidal-shaped apertures comprises six trapezoidal-shaped apertures.

4. The sewing aid of claim 1, wherein the implement is comprised of acrylic.

5. The sewing aid of claim 1, wherein the implement is about 0.060 inches thick.

6. The sewing aid of claim 1, wherein the implement is substantially clear.

7. The sewing aid of claim 1, wherein the implement is triangular in shape.

8. The sewing aid of claim 1, wherein one of the at least three edges is a bottom edge and the implement has a top, the plurality of apertures increasing in size in the direction starting at the top and moving toward the bottom edge.

9. A method for creating a box-bottom of a sewn item, the method comprising the steps of:
(a) providing a first piece of fabric and a second piece of fabric, each of the first and second pieces of fabric having at least three edges;
(b) providing a sewing aid having an aperture therein with a straight bottom;
(c) sewing the first piece of fabric to the second piece of fabric along three edges of at least one of the pieces of fabric to create a fabric member having a first seam and a second seam joined to define one corner of a pair of corners defined by the first and second pieces of fabric;
(d) separating the first piece of fabric from the second piece of fabric enough to align the first seam and the second seam front-to-back;
(e) extending the fabric member, corner first, through the aperture;
(f) engaging the fabric member to create a mark on the fabric member using the straight bottom of the aperture; and
(g) sewing the fabric member using the mark as a guide.

10. The method of claim 9, wherein the sewing aid comprises a plurality of apertures.

11. The method of claim 9, wherein the aperture of the sewing aid is substantially trapezoidal in shape.

12. The method of claim 9, wherein the first and second pieces of fabric are each substantially rectangular in shape.

13. The method of claim 9, wherein the corner is a first corner, the mark is a first mark, and the fabric member has a third seam, which together with the second seam defines a second corner, the method further comprises the step of separating the first piece of fabric and the second piece of fabric to align the second seam and the third seam front-to-back, extending the second corner through the aperture, engaging the fabric member to create a second mark on the fabric member using the bottom of the aperture, and sewing the fabric member using the second mark as a guide.

* * * * *